F. D. HALL.
AUTOMOBILE SLEEPER.
APPLICATION FILED JUNE 23, 1915.

1,243,288.

Patented Oct. 16, 1917.
2 SHEETS—SHEET 1.

Witnesses:

Inventor:
Frank D. Hall.
Attorney

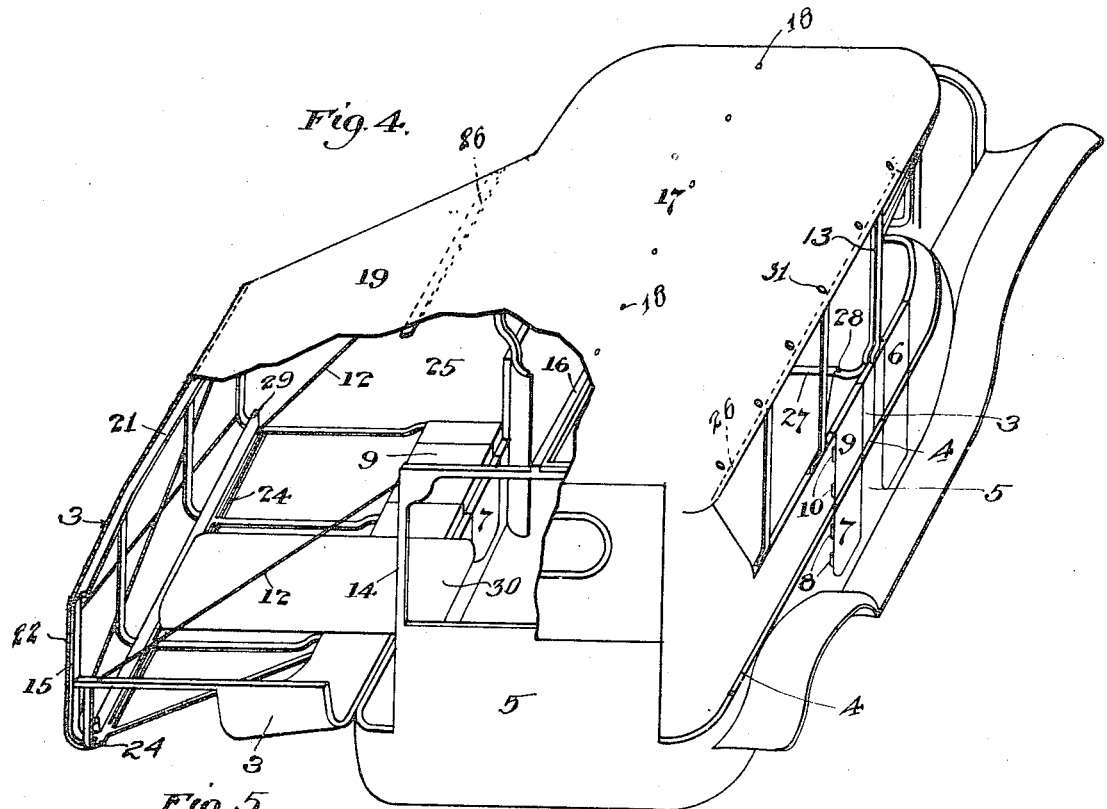
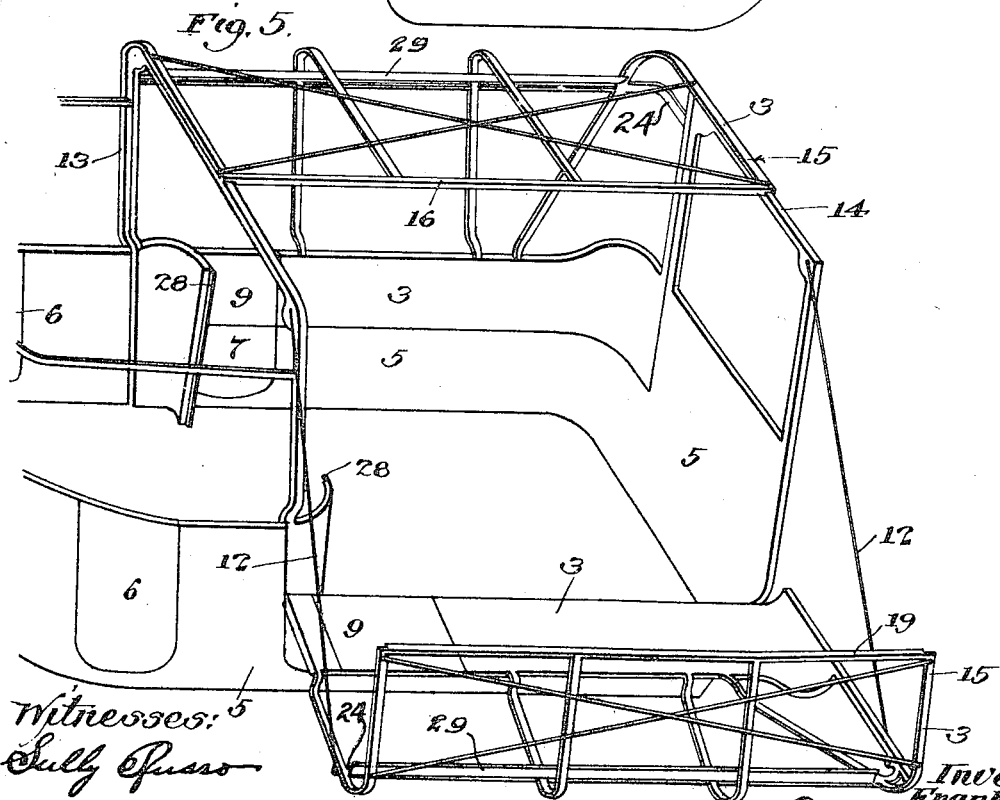

UNITED STATES PATENT OFFICE.

FRANK D. HALL, OF LOS ANGELES, CALIFORNIA.

AUTOMOBILE-SLEEPER.

1,243,288.  Specification of Letters Patent.  Patented Oct. 16, 1917.

Application filed June 23, 1915.  Serial No. 35,853.

*To all whom it may concern:*

Be it known that I, FRANK D. HALL, a citizen of the United States, residing at Los Angeles, in the county of Los Angeles and State of California, have invented a new and useful Automobile-Sleeper, of which the following is a specification.

This invention relates to an automobile so constructed as to afford sleeping quarters.

An object of the invention is to make provision for converting an automobile from one of seemingly ordinary appearance into one that is capable of affording comfortable sleeping and dressing quarters.

Another object is to effect the foregoing by a construction that is of maximum simplicity and that provides for ease of operation in the conversion of the automobile from ordinary traveling condition to the condition affording sleeping quarters and vice versa.

Another object is to provide a construction whereby, when the parts are in their opened out positions, a single piece of material constitutes the covering of the top and movable body sections and also constitutes the outer side curtains of the movable body sections, and, when the parts are in their closed positions, said single piece of material is foldable neatly in the top.

The accompanying drawings illustrate the invention.

Fig. 4 is a perspective view of the automobile shown in Fig. 1, the chassis being omitted and the covering being partly broken away for clearness of illustration, and the parts being in the positions shown in Fig. 2.

Fig. 5 is a perspective view of the body shown in the preceding figures, the cover and seat cushions being omitted for clearness of illustration.

Figure 1:
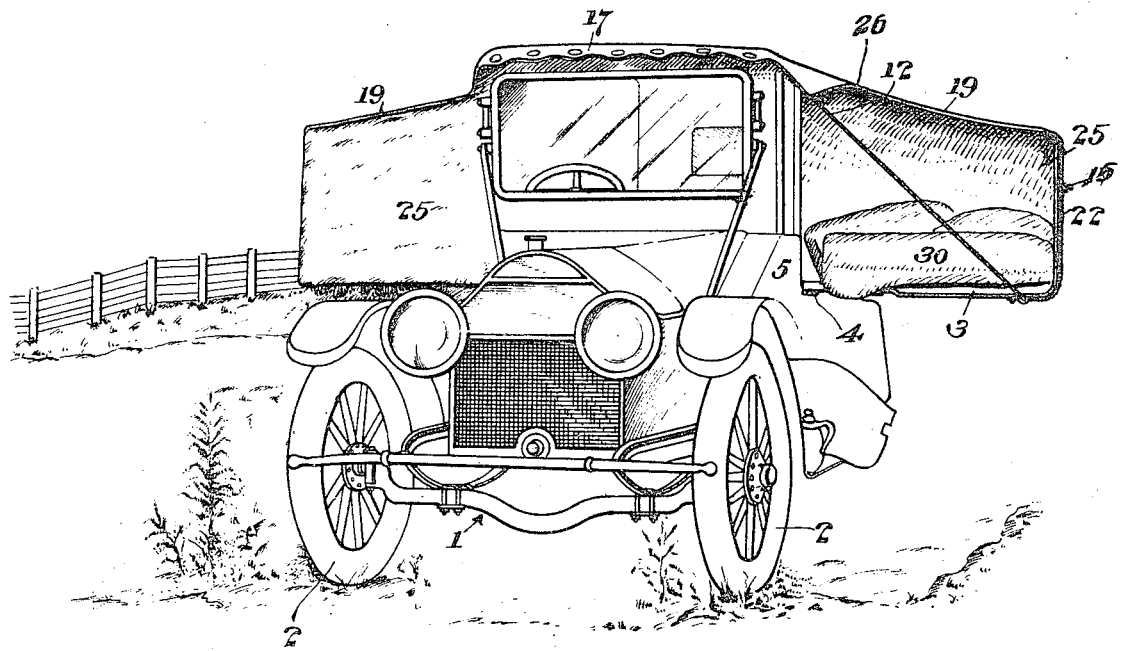
Figure 1 is a perspective view of an automobile built in accordance with this invention, the parts being opened out and arranged to form sleeping and dressing quarters, and one of the end curtains being omitted for clearness of illustration.

There is provided a chassis 1 having wheels 2 and supporting a sectional body having complementary movable sections 3 hinged at 4 to the stationary section 5. The body is provided with fore doors 6 and is provided with rear doors, said rear doors being formed in two parts, lower parts 7 forming portions of the stationary section 5 and vertically hinged at 8 to other portions of the stationary section, and upper parts 9 forming portions of the movable sections 3 and vertically hinged at 10 to other portions of the movable sections. The sections 3 at each side and the section 5 are hinged together by the horizontal hinges 4, so that each section 3 may be swung from closed position as at *d*, Fig. 2, to open position as at *b*. The movable sections 3 are provided with cables 12 or equivalents fastened to the top of front and rear ends 13, 14 of the stationary section 5.

The upper portions of the movable sections 3 are bent substantially at right angles to form in conjunction with one another a top frame 15, said movable sections 3 when in closed position seating against a longitudinal rib 16 which has its ends resting on and supported by the front and rear end members 13, 14.

The lower portion of the body may be closed and the upper portion of said body or the top as it is generally termed may be in the form of a frame-work provided with a suitable covering, which will now be described. Said covering may be made of one piece of material cut to proper shape and forming a middle portion 17 fastened longitudinally at 18 to the rib 16, said covering also forming intermediate portions 19 fastened at 20 to the longitudinal bars 21 of the movable sections 3, and said covering forming side portions or wings 22 extending over the top frame 15 to form outer side curtains when the sides are in the open positions, as in Fig. 1, said portions 22 being fastened at 23 to the frame 15 along the trimming line bar 24 of the top frame. Both ends of the movable sections 3 may be provided with end curtains 25 to close said ends. The covering is provided along its lines of folding or along any other suitable lines with strips 26 fastened by any suitable means to the covering and therebeneath, so as to facilitate folding of the covering when the sides are being operated to close them, the operator pressing the strips upward so as to raise the portions adjacent the lines of folding and prevent them sagging into the path of movement of the top frame 15.

The back 27 of the front seat may be detachably connected by mortised joints 28 to the stationary sections 5. The movable sections 3 may be provided with inwardly projecting flanges 29 against which one end of the cushions 30, only one of which is shown, is designed to rest when the cushions are placed transversely across the horizontal portions of the outwardly-swung sections 3, as clearly shown in Fig. 2, to form a mattress.

Figures 2, 3:
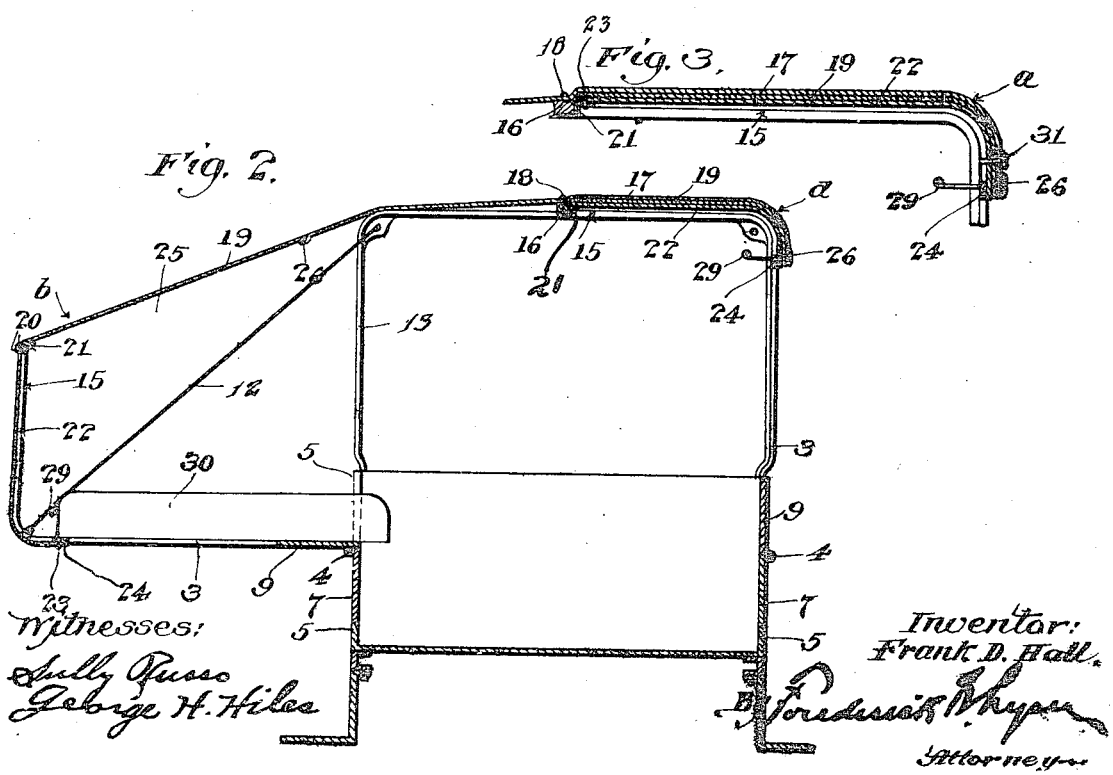
Fig. 2 is a transverse section of the automobile body in Fig. 1, one side being opened out to form a sleeping chamber and the other side being closed.
Fig. 3 is an enlarged sectional detail of some of the parts shown in Fig. 2.

The movable sections 3 are provided with buttons 31 or equivalents fastening the portions 17, 19, 22 of the covering together when the parts are in the positions shown in Fig. 3, this normally holding said sections in closed positions and holding said portions of the covering against displacement.

In practical operation, assuming that the automobile is in traveling condition, if it be desired to put the automobile into the condition shown in Fig. 1 to afford sleeping and dressing quarters, the buttons 31 will be operated to release the portions 19, 22 of the covering and the movable sections 3 will be swung outward and downward to extend and open them. Then the cushions 30 and such other bedding, not shown, as desired, will be put in position, as in Fig. 1, and the end curtains 25 will be fastened in place to form sleeping quarters at the sides of the automobile and dressing quarters in the middle.

When it is desired to put the automobile back into the condition for traveling, the parts will be operated reversely to the operation just described and during the swinging in of the movable sections, the operator will force the strips 26 upward so that the frame 15 will pass beneath the portion 17 of the covering and the portion 19 will neatly fold over the portion 22 and the portion 17 will neatly fold over the portion 19, as clearly shown in Figs. 2 and 3.

I claim:

1. In an automobile, a body, the top of said body being formed in sections, the edges of which are adapted to come together to close the top of the body, the walls of the body being respectively secured to said top sections, and said walls and top sections being adapted to be let down to form a sleeping compartment, and a cover extending over said body when said sections are let down.

2. In an automobile, a body, the top of said body being formed in sections, the walls of the body being respectively secured to the top section, a beam in the upper portion of the body adapted to rest between said top sections when the top sections are in their normal upright positions, means for securing the top sections and said walls in their normal inclosing positions, and said walls and top sections being adapted to be let down to form a sleeping compartment.

3. In an automobile, a body, the upper portions of the sides of the body being hinged to the lower portion of the body, doors, the upper portions of the doors being hinged to the upper portions of said sides, the lower portions of the doors being hinged to the lower body portion, and the upper portions of the doors being hinged to the lower portions thereof.

4. In an automobile, a body having stationary and movable sections connected together, said movable sections when in open position extending out from the stationary section and said movable sections when in closed position extending over the stationary section and the overlying portions of the movable sections being spaced from the stationary section, and a cover having superposed portions supported by the movable sections when said movable sections are in closed position.

5. In an automobile, a body having stationary and movable sections connected together, the stationary section having a flexible covering fastened thereto and said covering being fastened to the movable section to form a shelter when the movable section is in open position and said covering being foldable over the stationary section to form a roof when the movable section is in closed position.

6. In an automobile, a body having stationary and movable sections connected together, said movable section when in closed position extending over the stationary section and when in open position extending out from the stationary section, the stationary section having a covering fastened thereto and said covering being fastened to the movable section to form a shelter when the movable section is in open position, said covering being folded in superposed portions over the stationary section when the movable section is in closed position to form a shelter above the stationary section.

7. In an automobile, a body having its upper portions forming an open frame and extensibly connected to the lower portions, and a foldable covering fastened to the frame and extending over the entire body when said frame is extended, said covering folding above the body when said frame is in closed position.

8. In an automobile, a body having its upper portions forming an open frame and extensibly connected to the lower portions, and a foldable covering fastened to the frame and extending thereover when said frame is extended, said covering being fastened to the frame and folding onto the frame in superposed portions when said frame is moved away from the extended position.

9. In an automobile, a body having outwardly swinging sections, and a flexible covering extensible over said swinging sections by movement of said sections, said covering folding above the body and above portions of the sections when said sections are in closed position to form a shelter for the space beneath said portions.

10. In an automobile, a body having stationary and movable sections, the upper portion of the movable sections being in the form of an open frame, and a flexible covering on the open portions of the movable sections and extending over the body when said sections are in open position and foldable on a portion of said open frame when said sections are in closed position.

In testimony whereof, I have hereunto set my hand at Los Angeles, California, this 18th day of June, 1915.

FRANK D. HALL.

In presence of—
   GEORGE H. HILES,
   LORA M. BOWERS.